Patented Mar. 9, 1954

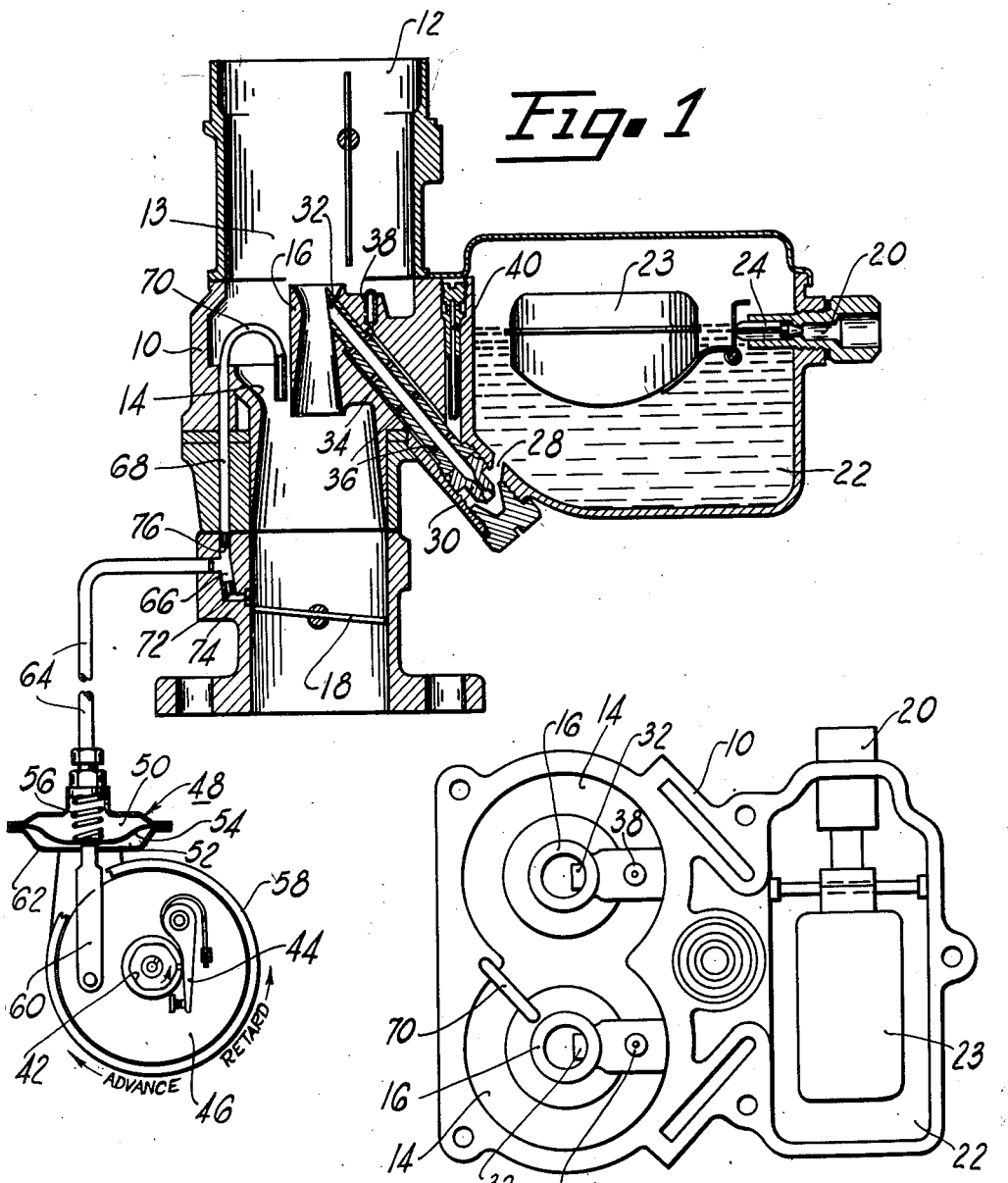

2,671,437

UNITED STATES PATENT OFFICE 2,671,437

IGNITION TIMING DEVICE

Albert H. Winkler, Elmira, N. Y., assignor to Bendix Aviation Corporation, South Bend, Ind., a corporation of Delaware Application September 14, 1951, Serial No. 246,570

5 Claims. (Cl. 123—117)

This invention relates to charge forming devices for internal combustion engines having a variable throttled air supply, and more particularly to improvements in the port arrangement for vacuum spark advance in the air induction system of internal combustion engines.

The spark advance art has long taught that optimum spark advance for any engine speed and load varies directly as a function of engine speed and inversely as a function of engine load. For various combinations of engine speed and load the spark will be relatively advanced or retarded depending on whether high speed and/or low load obtain or whether low speed and/or high load obtain, respectively. In the past some difficulty has been experienced with vacuum spark controls in obtaining sufficient vacuum under the various engine operating conditions to give proper regulation of the spark advance. It is therefore an object of this invention to provide a vacuum spark control system which will meet engine spark advance demands at all engine loads and speeds.

It is another object of this invention to provide means for utilizing the maximum suction available in the carburetor of an internal combustion engine, at high engine speeds and loads, to a maximum degree for proper spark advance control at those speeds and loads.

Other objects and advantages will be readily apparent from the following detailed description taken in connection with the accompanying drawings in which:

Figure 1 is a sectional view of a carburetor and partial section of a spark advance mechanism; and Figure 2 is a plan view of a carburetor with the air horn removed.

Referring to Figures 1 and 2, a carburetor body is shown at numeral 10 having an air inlet 12, an induction passage 13, main and auxiliary venturis 14 and 16, respectively, and a throttle valve at 18 in the air induction passage 13. Fuel is supplied from a pump (not shown) through a fuel inlet passage 20 to a float chamber 22, the height of fuel in said float chamber being at all times controlled by a float 23 and a needle valve 24. From float chamber 22 fuel flows through conduit 28 and main metering jet 30 to the discharge nozzle 32 which opens into the throat of auxiliary venturi 16. An annular well 34 communicates with discharge nozzle 32 through passages 36 and with the induction passage through a high speed bleeder 38. An idle tube is shown in part at 40.

The timing mechanism is conventional and as shown consists of the usual rotatable cam 42 which operates the electrical circuit breaker 44. The circuit breaker 44 is mounted on the plate 46 which is rotated clockwise to advance the spark and counterclockwise to retard the spark. A suction device 48 is utilized for advancing and retarding the spark, and consists of chambers 50 and 52 which are separated by a flexible diaphragm 54 which is spring loaded by the compression coil spring 56 and is connected to the timing mechanism 58 by a lever 60. Chamber 52 communicates with the atmosphere through perforations in the wall 62.

In the vacuum control portion of the spark advance device, chamber 50 is connected to a port adjacent the throttle valve by a conduit 64 and a passage 66, and to the primary venturi by conduit 64, a passage 68 and an inverted U-shaped tube 70 which opens into said venturi in a plane defined substantially by the Venturi throat. Passage 66 contains a restriction 72 and is connected to induction passage 13 by means of a cylindrical recess 74 in the wall of said induction passage, and passage 68 contains a restriction 76.

The primary function of U-tube 70 is to provide a source of sufficient suction at full load, high speed operation so that sufficient spark advance is obtained at said condition, whereas the secondary function of U-tube 70 is to variably bleed down the manifold vacuum which exists in that portion of recess 74 on the manifold side of throttle 18 when operating at low speeds in a part throttle position.

Restrictions 72 and 76 in conduits 66 and 68 respectively are used to calibrate the operation of suction device 48 so as to satisfy varying spark advance requirements for different engines, whereas the configuration of recess 74 insures that over-advance of the spark will not exist during part load operation of the engine. The primary function of recess 74 is to insure correct spark advance at partial engine loads, especially at low and intermediate engine speeds.

The operation of my device is as follows:

Assuming that the engine is idling, throttling valve 18 will be closed and the recess 74 will be on the carburetor side of the throttle valve. Under such conditions chamber 50 of suction device 48 will not be subjected to sufficient vacuum to advance timing mechanism 58 against spring 56 and the spark will be maintained in a fully retarded position. As the throttle valve is opened at a given low engine load, the engine speed will increase requiring an advance in the spark. As the throttle valve moves across recess 74, increasing suction, due to the manifold vacuum in recess 74, is effected by the increasing portion of said recess on the engine side of the throttle valve, resulting in an increasing vacuum in chamber 50 and an advancing spark. During the same time U-tube 70 decreasingly bleeds down the vacuum existent in conduit 66 as a result of the decreasing pressure in the throat of venturi 14 with increasing engine speed. The bleed back through U-tube 70 will diminish as the air flow increases and the manifold vacuum decreases. At some point, depending upon throttle position and air flow, conduit 66 becomes a bleed back for conduit 68.

If, at any given intermediate or high engine speed and part throttle position the engine load suddenly increases, and the throttle valve is opened an amount sufficient to maintain said engine speed, a resultant retardation of the spark is required. Since opening of the throttle valve bleeds down the manifold vacuum, the pressure in chamber 50 will increase proportionately to the increased load and the required retardation of the spark results. The part load and full load spark advance curves of any particular engine may be met by properly calibrating restrictions 72 and 76.

At a high speed and full load engine condition, valve 18 is wide open and the vacuum existent in the manifold is insufficient to actuate diaphragm 54 against spring 56 to sufficiently advance the spark. The U-tube 70, being inserted in venturi 14 at a point of maximum suction and opening in the direction of air flow, utilizes to a maximum degree the high suction existent in the venturi during the stated condition of engine operation, so that the required spark advance is realized when said suction is partially bled down by manifold pressure through recess 74 and restriction 72. The pressure within the U-tube 70 is somewhat lower than is the Venturi throat pressure due to the configuration and position of said tube. As modified by manifold pressure bleed down, the U-tube suction, as communicated to chamber 50, advances the spark the required amount.

While I have described a particular embodiment of my invention for the purpose of illustration it should be understood that various modifications thereof may be made within the spirit of the invention as set forth in the claims.

I claim:

1. A carburetor having a spark advance connection, comprising an air induction passage, a venturi in the induction passage, a throttle valve in the induction passage downstream from the venturi, a U-shaped tube opening in the direction of air flow in the passage through the venturi at a position substantially in the plane defined by the Venturi throat, a cylindrical recess in the wall of said induction passage and on the Venturi side of the throttle valve when said valve is in a closed position, a first conduit connecting said tube to the recess, a second conduit connected at one end to said first conduit and adapted to be connected at its opposite end to a suction chamber of an ignition timing mechanism.

2. In a carburetor, an air induction passage, a venturi in the induction passage, a throttle valve in the induction passage downstream from the venturi, a U-shaped tube opening in the direction of air flow in the passage through the venturi and ported in the venturi at a point of maximum suction therein when air is flowing therethrough, a port opening into said induction passage on the Venturi side of the throttle valve when said valve is in a closed position, a first conduit connecting said tube to the port, a second conduit connected at one end to said first conduit and adapted to be connected at its opposite end to a suction chamber of an ignition timing mechanism.

3. A carburetor having a spark advance connection, comprising an air induction passage, a venturi in the induction passage, a throttle valve in the induction passage downstream from the venturi, a gooseneck tube in the Venturi opening at a position substantially in the plane defined by the Venturi throat, a cylindrical recess opening into said induction passage and being wholly on the Venturi side of the throttle valve when said valve is in a closed position and increasingly opening into the manifold side of the induction passage as the throttle valve opens, a first conduit connecting said tube to the recess, a restriction in said conduit, a second conduit connected at one end to said first conduit and adapted to be connected at its opposite end to a suction chamber of an ignition timing mechanism, whereby a substantially optimum spark advance at any combination of engine load and speed is realized.

4. In a carburetor, an air induction passage, a venturi in the induction passage, a throttle valve in the induction passage downstream from the venturi, a U-shaped tube opening in the direction of air flow in the venturi at a position substantially in the plane defined by the Venturi throat, a port opening into said induction passage on the Venturi side of the throttle valve when said valve is in a closed position and being increasingly vented to manifold vacuum as a function of throttle valve opening, a passageway for connecting the tube and port, a conduit connected to said passageway and adapted to be connected to a suction chamber of a spark advance mechanism, and a plurality of calibrated restrictions in said passageway, whereby the pressure in said conduit is substantially proportional, at all engine loads and speeds, to the optimum spark advance demands of the engine.

5. In a device of the type described, an air induction passage, a venturi in the induction passage, a throttle valve in the induction passage downstream from the venturi, and a U-shaped tube in the passage opening at a position substantially in the plane defined by the Venturi throat and adapted to be connected to the suction chamber of a spark advance mechanism.

ALBERT H. WINKLER.

References Cited in the file of this patent

UNITED STATES PATENTS

| Number | Name | Date |
|---|---|---|
| 1,328,453 | Roesch | Jan. 20, 1920 |
| 1,338,336 | Stone | Apr. 27, 1920 |
| 2,134,354 | Boyce | Oct. 25, 1938 |
| 2,317,885 | Colvin | Apr. 27, 1943 |
| 2,475,717 | Ostling | July 12, 1949 |